(12) United States Patent
Yebka et al.

(10) Patent No.: US 9,070,924 B2
(45) Date of Patent: Jun. 30, 2015

(54) BATTERY COVER RELEASE

(71) Applicant: Lenovo (Singapore) Pte. Ltd., Singapore (SG)

(72) Inventors: Bouziane Yebka, Apex, NC (US); Joseph Anthony Holung, Wake Forest, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 233 days.

(21) Appl. No.: 13/709,370

(22) Filed: Dec. 10, 2012

(65) Prior Publication Data

US 2014/0160655 A1    Jun. 12, 2014

(51) Int. Cl.
*H01M 2/10* (2006.01)
*H01M 10/052* (2010.01)
*H01M 10/0565* (2010.01)

(52) U.S. Cl.
CPC ........ *H01M 2/1066* (2013.01); *Y10T 29/49002* (2013.01); *H01M 10/052* (2013.01); *H01M 10/0565* (2013.01); *Y02E 60/122* (2013.01); *Y02T 10/7011* (2013.01)

(58) Field of Classification Search
CPC ... H01M 10/443; H01M 10/445; H01M 2/34; H01M 2/08; H02J 7/0026; H02J 7/0031; H02J 7/0022; H02J 7/0029; Y02E 60/12
USPC ......... 320/114, 115, 151, 152, 156, 157, 162, 320/163, 164, 165, 137; 361/679.01, 361/679.02; 429/53, 54, 55
See application file for complete search history.

(56) References Cited

U.S. PATENT DOCUMENTS

| | | | |
|---|---|---|---|
| 5,204,611 A * | 4/1993 | Nor et al. ...................... 320/145 |
| 7,969,730 B1 * | 6/2011 | Doherty et al. .......... 361/679.54 |
| 2007/0059586 A1 * | 3/2007 | Matsumoto et al. ............ 429/53 |
| 2009/0146614 A1 * | 6/2009 | Carrier et al. .................. 320/152 |
| 2010/0301804 A1 * | 12/2010 | Stone et al. .................... 320/110 |
| 2014/0232343 A1 * | 8/2014 | Tadd et al. ..................... 320/114 |

FOREIGN PATENT DOCUMENTS

JP    2008-226496 A    9/2008
JP    2011-258535 A    12/2011

* cited by examiner

*Primary Examiner* — Anthony Haughton
(74) *Attorney, Agent, or Firm* — Brian J. Pangrle

(57) ABSTRACT

An assembly can include a chassis that includes a processor, a memory device with memory accessible by the processor, a battery bay and a cover seat; a cover securable in a seated state with respect to the cover seat to cover the battery bay; and an automatic release mechanism automatically actuatable by an increase in battery volume of a lithium battery disposed in the battery bay to release the cover from its seated state. Various other apparatuses, systems, methods, etc., are also disclosed.

20 Claims, 10 Drawing Sheets

BATTERY COVER RELEASE

TECHNICAL FIELD

Subject matter disclosed herein generally relates to technology and techniques for equipment including one or more batteries.

BACKGROUND

Electrochemical cells include, for example, lithium-ion cells. Where a lithium-ion cell is contained in a package, over time, the package may swell responsive to heating, generation of gas, expansion of electrode material, etc. For example, decomposition of electrolyte and reactions with impurities may cause generation of gas, heating may cause expansion of gas, and aging and degradation during cycling and extended storage may cause expansion of electrode material. Where a package is received by an electronic device or system, an increase in volume may result in damage to the device or system. Various technologies and techniques described herein may, for example, reduce risk of such damage.

SUMMARY

An assembly can include a chassis that includes a processor, a memory device with memory accessible by the processor, a battery bay and a cover seat; a cover securable in a seated state with respect to the cover seat to cover the battery bay; and an automatic release mechanism automatically actuatable by an increase in battery volume of a lithium battery disposed in the battery bay to release the cover from its seated state. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
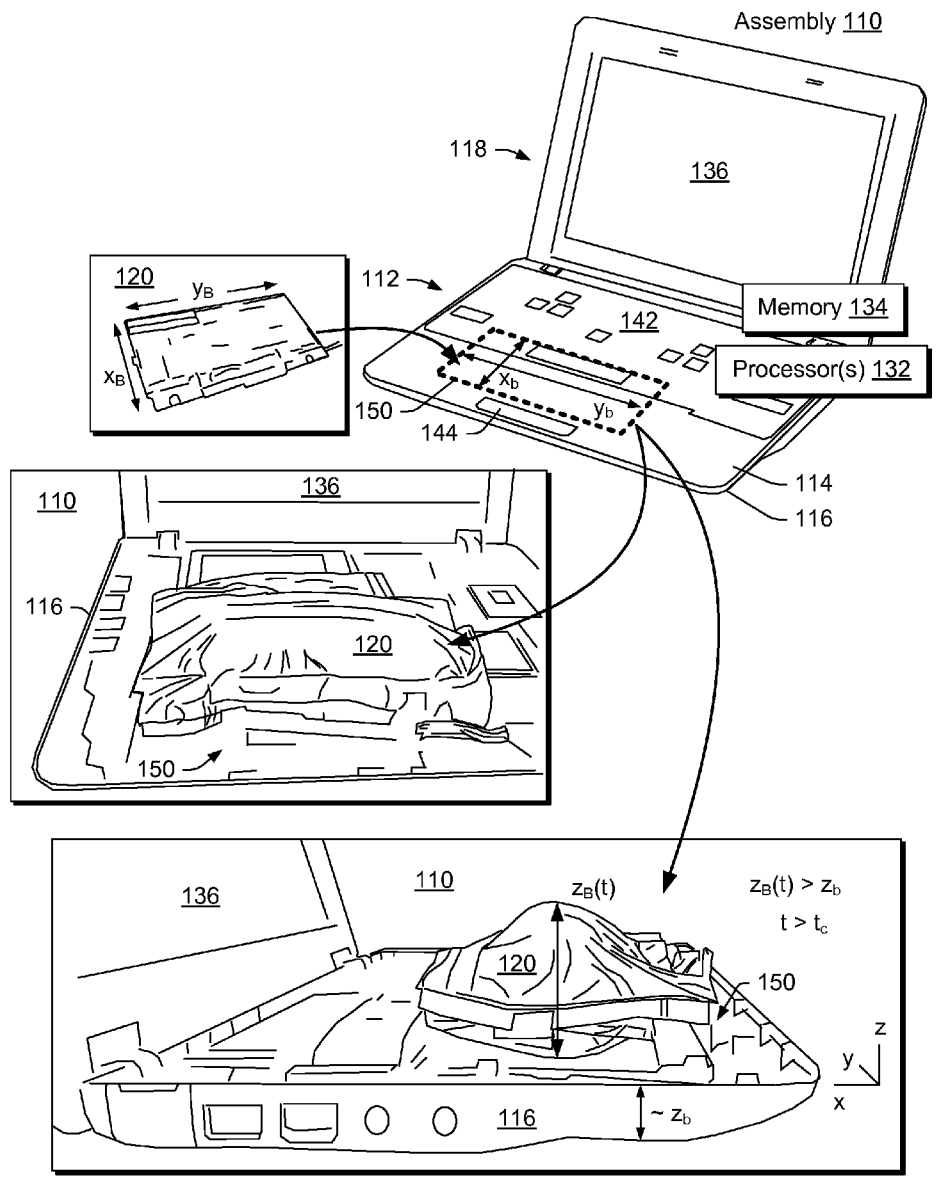
FIG. 1 is a series of diagrams of an example of an assembly that includes a lithium battery.

FIG. 1 shows an example of an assembly 110 that includes two chassis 112 and 118, which may be positionable with respect to each other via a hinge or other mechanism. In the example of FIG. 1, the chassis 112 can include a top component 114 that mounts to a base component 116 (e.g., via a snap or press-fit, screws, etc.). As shown, the top component 114 may be shaped to accommodate a keyboard 142 and an input device 144. Components such as one or more processors 132, a memory device 134 with memory, etc., may be housed within the chassis 112 (and/or optionally the chassis 118). In the example of FIG. 1, the chassis 118 includes a display 136, for example, for rendering information under control of at least one of the one or more processors 132 (e.g., a CPU, a GPU, etc.). The assembly 110 may include instructions stored in memory of the memory device 134, for example, to instruct at least one of the one or more processors 132. In turn, information may be directed to a frame buffer or other memory and rendered to the display 136. As an example, a user may interact with the assembly 110 via the keyboard 142, the input device 144, the display 136 (e.g., as a touchscreen display), etc.

In the example of FIG. 1, the chassis 112 includes a battery bay 150 configured to receive a battery 120, for example, to power various components of the assembly 110. The battery 120 may be a lithium-ion battery, for example, in a particular format (e.g., pouch, prismatic, etc.). As an example, the battery 120 may be a lithium-ion polymer battery, which may be referred to as a lithium polymer battery or a lithium-ion polymer battery or a lithium-polymer battery (e.g., "LiPo battery" or "LiPo cell").

A lithium battery may be provided in a pouch format or a prismatic format. A lithium battery in a pouch format can include a flexible, foil-type (e.g., polymer laminate) case; whereas, a lithium battery in a prismatic format can include a rigid case. As an example, a rigid case may be configured to apply force to electrodes and separator materials for purposes of contact. As an example, for a lithium polymer battery, such applied force may not be required as electrode and separator sheets may be laminated for purposes of contact. Whether a lithium battery is in a pouch format or a prismatic format, it can experience swelling (e.g., volume increase).

A LiPo battery may include a polymer composite material such as polyethylene oxide or polyacrylonitrile that includes lithium salt. LiPo cells are sometimes referred to as laminate cells, which may be configured to be very thin or quite large depending on their intended use. One or more LiPo cells may be encased in a flexible aluminum foil laminate pouch (e.g., where the foil has a thickness on the order of about 0.1 mm). LiPo cells may include a stacked construction formed by stacking electrode and electrolyte materials in a flat sandwich (e.g., defined by length, width and height dimensions). Stacked layers may be packed in a package (see, e.g., the battery 120 as being in pouch package) in a flat, rolled or other configuration. LiPo cell capacities can include capacities in a range, for example of about 50 mA·hrs (e.g., for a small cell such as for a Bluetooth headset) to about 10 A·hrs or more for an electric vehicle (e.g., electric or hybrid).

As to function of a lithium-ion cell, lithium ions move from a negative electrode to a positive electrode during discharge and reversely when being charged. As an example, a LiPo cell can include a polyethylene (PE), a polypropylene (PP), a PP/PE, or other material as a separator. Some LiPo cells include a polymer gel containing an electrolyte solution, which is coated onto an electrode surface. For LiPo cells, close packing can allow for a high density.

For lithium-ion cells, when cell voltage drops to a low value (e.g., about 1.5 V), reactions at an anode can produce gas (e.g., over-discharge or "OD"). If voltage continues to drop (e.g., under about 1 V), copper of a copper-based anode current collector can start to dissolve and may short out a cell. When cell voltage increases to a high value (e.g., about 4.6V), gassing may occur at a cathode as electrolyte may start to decompose (e.g., overcharge or "OO"). As an example, a lithium-ion cell or cells may be connected to an external thermal fuse for overcharge protection (e.g., in addition to the control by management circuitry). A normal operating range may lie between an overcharge region (OC) and an over-discharge region (OD); noting that cell damage may occur in the OO region or the OD region.

In the example of FIG. 1, the assembly 110 may be a computer (e.g., optionally a "netbook" or other type of information handling assembly) where the battery bay 150 is not intended to be end-user accessible, for example, for user servicing or user replacement of the battery 120. Where the top and base components 114 and 116 of the chassis 112 are fixedly connected and substantially rigid, expansion of the battery 120 in the battery bay 150 (e.g., due to gas generation) may result in the battery 120 increasing in volume and applying pressure to the top and base components 114 and 116 of the chassis 112. If the applied pressure exceeds a critical pressure, the chassis 112 may deform, split, break, etc.

As an example, consider the battery 120 of FIG. 1 as being a LiPo battery with a pouch of about six inches in length ($y_B$), about three inches in width ($x_B$) and about half an inch in height ($z_B$); the battery 120 being rated at about 4200 mA·hrs at about 7.3 V. In such an example, the battery bay 150 of the chassis 112 may have a height ($z_b$) slightly more than that of the battery 120. As shown in FIG. 1, in response to gas generation, the pouch of the LiPo battery 120 increases in volume to a height well beyond that of the battery bay 150. For purposes of illustrating the extent of the increase in height, the chassis 112 is shown in two views with the top component 114 as well as the keyboard 142 removed. In such an example, the pressure exerted by the battery 120 in its gas enlarged state is greater than a critical pressure of the chassis 112 and hence the chassis 112 deforms, splits, breaks, etc.

An assembly that includes an embedded battery (e.g., one that is not intended to be customer replaceable) can disappoint consumers who do not expect the assembly to be damaged by swelling of the embedded battery, especially after expiration of a warranty period. As an example, to avoid damage due to battery swelling, an assembly can include a mechanism that is activated in response to battery swelling. For example, a mechanism may respond to change in one or more dimensions, pressure, etc., caused by swelling to activate the mechanism where the mechanism acts to open a cover of an assembly, which may avoid damage to the assembly (e.g., non-elastic deformation, splitting, breaking, etc. of one or more components).

Figure 2:
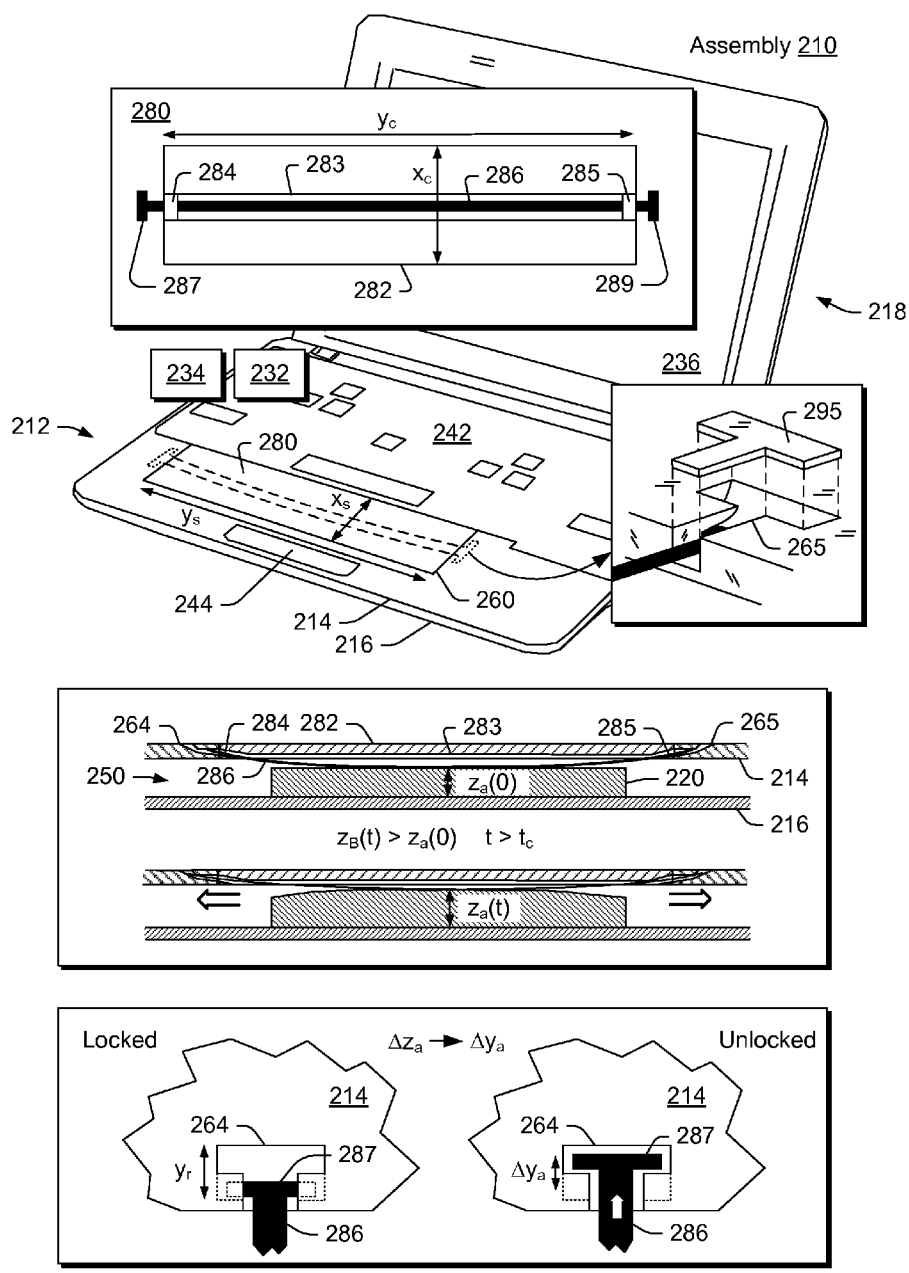
FIG. 2 is a series of diagrams of an example of an assembly that includes a lithium battery, a cover and a cover release mechanism.

FIG. 2 shows an example of an assembly 210 that includes two chassis 212 and 218, which may be positionable with respect to each other via a hinge or other mechanism. In the example of FIG. 2, the chassis 212 can include a top component 214 that mounts to a base component 216. The top component 214 may be shaped to accommodate a keyboard 242 and an input device 244. Components such as one or more processors 232, a memory device 234 with memory, etc., may be housed within the chassis 212 (and/or optionally the chassis 218). In the example of FIG. 2, the chassis 218 includes a display 236, for example, for rendering information under control of at least one of the one or more processors 232 (e.g., a CPU, a GPU, etc.). The assembly 210 may include instructions stored in memory of the memory device 234, for example, to instruct at least one of the one or more processors 232. In turn, information may be directed to a frame buffer or other memory and rendered to the display 236. As an example, a user may interact with the assembly 210 via the keyboard 242, the input device 244, the display 236 (e.g., as a touchscreen display), etc.

In the example of FIG. 2, the chassis 212 includes a battery bay 250 configured to receive a battery 220, for example, to power various components of the assembly 210. The battery 220 may be a lithium-ion battery such as, for example, a lithium-ion polymer battery, which may be referred to as a lithium-ion battery or a lithium-ion polymer battery or a lithium-polymer battery (e.g., "LiPo battery" or "LiPo cell"). As an example, the battery 220 may be in a pouch format or a prismatic format.

To avoid damage due to swelling of the battery 220, the assembly 210 includes a mechanism that includes a cover assembly 280 that cooperates with a cover seat 260 and receptacles 264 and 265 of the top component 214. As shown in the example of FIG. 2, the cover assembly 280 includes a cover 282 with a longitudinal groove 283 and groove bridges 284 and 285 and includes a bar 286 with fasteners 287 and 289, where the bar 286 may be elastically deformable and where the fasteners 287 and 289 may be T-shaped (e.g., T-shaped hooks, grasps, etc.). As to the receptacles 264 and 265, each is shaped for receipt of a respective one of the fasteners 287 and 289 and to allow for longitudinal movement of a respective one of the fasteners 287 and 289 therein between a locked state and an unlocked state. As to the bridges 284 and 285, these can provide for retaining the bar 286 with respect to the cover 282 and, for example, applying points of contact between the bar 286 and the cover 282. As an example, one or both of the bridges 284 and 285 may be formed integrally with the cover 282 or configured for attachment to the cover 282 (e.g., via press-fit, adhesive, welding, etc.).

In the example of FIG. 2, consider an example scenario where an increase in height of the battery 220 to an actuation height ($z_a$) of the bar 286 may cause the bar 286 to elastically deform and elongate such that the fasteners 287 and 289 translate outwardly in their respective receptacles 264 and 265 of the top component 214. For a sufficient, optionally predetermined, amount of height increase of the battery 220, the fasteners 287 and 289 may translate to the unlocked state whereby the cover 282 may be released from the cover seat 260 of the top component 214. Accordingly, the cover 282 may transition from a seated state with respect to the cover seat 260 to an unseated state with respect to the cover seat 260 via the mechanism in response to a change in volume of the battery 220 as located in the battery bay 250.

In the example of FIG. 2, the assembly 210 may include receptacle covers such as the receptacle cover 295, which is configured to cover the receptacle 265 of the top component 214 of the chassis 212. As an example, the receptacle cover 295 may prevent debris from entering a receptacle, provide for a smooth upper surface (e.g., flush surface) for the top component 214, etc. As an example, a receptacle cover 295 may be press-fit into a receptacle via application of pressure. In such an example, the receptacle cover 295 may be unfit (e.g., popped-off) by pressure applied to the receptacle cover 295 by a fastener, etc., of a mechanism. For example, upon swelling of the battery 220, upward pressure may be transferred to the fastener 289 in the receptacle 265 where, in turn, the fastener 289 applies pressure to the receptacle cover 295 to pop it off or otherwise unseat it (e.g., to allow for unseating of the cover 282 from the cover seat 260).

In the example of FIG. 2, the cover seat 260 may be formed with tabs, a rim, etc., to seat the cover 282, for example, along an edge or edges of the cover 282. As an example, a cover and a cover seat may cooperate via one or more hinges, for example, such that one edge of the cover remains connected to the cover seat via a hinge. In such an example, the cover may rotate (e.g., swing) open to an unseated state in response to an increase in volume of a battery located in a battery bay of a chassis. As an example, a cover seat may act to seat (e.g., support) a cover such that in a seated state the cover is not susceptible to falling into an interior space of a device.

While the example of FIG. 2 shows the cover 282 as being next to a keyboard (e.g., on a top surface), an assembly may include a cover in a cover seat of a base portion. As an example, an assembly may include more than one cover, for example, with a cover seated with respect to a top surface and another cover seated with respect to a base surface, multiple top surface covers, multiple base surface covers, etc.

In the example of FIG. 2, the bar 286 may apply some pressure to the battery 220, which may, for example, act to locate the battery 220 in the battery bay 250. As an example, a bar 286 may bias a battery 220 with sufficient force to overcome mass of the battery 220 under acceleration of gravity (e.g., $F > m_B g$, where $m_B$ is mass of the battery 220). In such an example, if the assembly 210 is rotated, the bar 286 may prevent flopping of the battery 220 in the battery bay 250 as orientation of the assembly 210 with respect to gravity changes. In such an example, a mechanism may provide for stabilizing a battery in a bay as well as releasing a cover in response to swelling of the battery in the bay.

As an example, an assembly can include a chassis that includes a processor, a memory device with memory accessible by the processor, a battery bay and a cover seat; a cover securable in a seated state with respect to the cover seat to cover the battery bay; and an automatic release mechanism automatically actuatable by an increase in battery volume of a lithium battery (e.g., a LiPo battery or other type of lithium battery) disposed in the battery bay to release the cover from its seated state.

As an example, an assembly may include a manual release mechanism to release a cover from its seated state. For example, a manual release mechanism may include a member selected from a group consisting of a bolt, a screw, a lever, a knob, a button, and a latch.

As an example, an automatic release mechanism may include a movable connector connectable for movement responsive to an increase in battery volume of a lithium battery. In such an example, the automatic release mechanism can include a cover fastener translatable by movement of the movable connector to release a cover from its seated state.

As an example, an automatic release mechanism can include an elastic connector that connects a cover to a chassis. In such an example, the elastic connector may apply a biasing force to bias the cover in its seated state, the biasing force being less than an expansion force associated with an increase in battery volume of a lithium battery disposed in a battery bay.

As an example, an automatic release mechanism can include an elastic bar elastically deformable responsive to an expansion force associated with an increase in battery volume of a lithium battery disposed in a battery bay. In such an example, the elastic bar can include a fastener and a chassis can include a receptacle where deformation of the elastic bar translates the fastener in the receptacle for release of the fastener from the receptacle.

As an example, an assembly may include a strain gauge positioned to sense strain responsive to an increase in battery volume of a lithium battery disposed in a battery bay. In such an example, the assembly may include circuitry to issue a trigger based at least in part on a sensed strain signal.

As an example, an assembly can include a chassis where the chassis includes a mechanical keyboard (e.g., with depressible keys). As an example, a chassis may include a touchscreen display (e.g., to be powered by a battery such as a LiPo battery). As an example, an assembly can include one or more electric motors. For example, an assembly may be a power tool, a vehicle, a toy, etc.

As an example, an assembly may include an automatic release mechanism that is automatically actuatable by a predetermined increase in battery volume of a lithium battery disposed in a battery bay to release a cover from its seated state.

Figure 3:
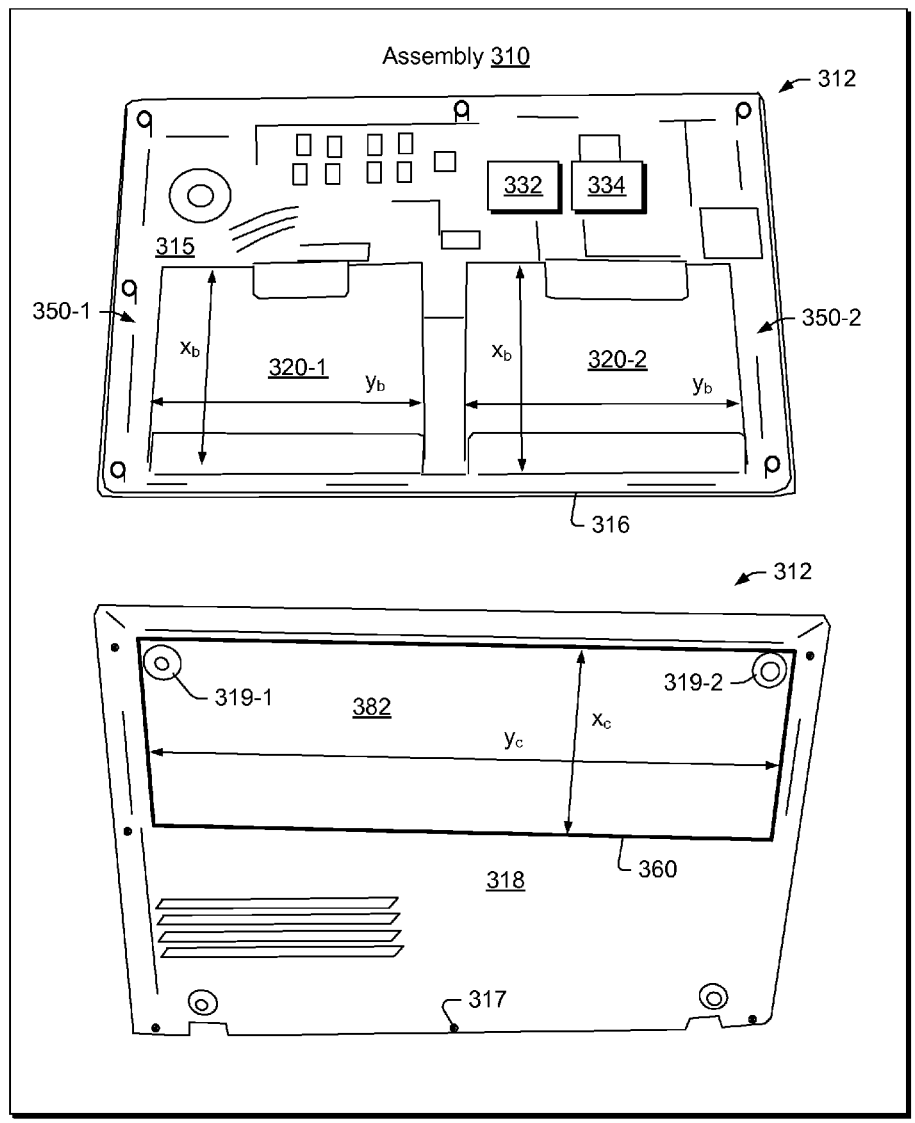
FIG. 3 is a series of diagrams of an example of an assembly that includes a cover that covers one or more battery bays.

FIG. 3 shows an example of an assembly 310 that includes a chassis 312 that may include one or more processors 332, one or more memory devices 334, etc. In the example of FIG. 3, the assembly 310 includes a battery bay 350-1 and a battery bay 350-1. As shown, a battery 320-1 is located in the battery bay 350-1 and a battery 320-2 is located in the battery bay 350-2 where each of the batteries 320-1 and 320-2 has dimensions (e.g., in an x, y, z Cartesian coordinate system).

In the example of FIG. 3, the chassis 316 has a floor 315 and a surrounding wall 316 (or walls), which may define a chassis depth (e.g., with respect to a z-axis). As shown, the floor 315 has an opposing side or bottom 318 which includes a cover seat 360 for seating a cover 382 that covers the battery bays 350-1 and 350-2. In the example of FIG. 3, the cover 382 includes feet 319-1 and 319-2, for example, to support the chassis 312 on a surface such as a surface of a table, a desk, etc. Also shown in FIG. 3 are screw holes 317, for example, for securing one or more components to the chassis 312. The screw holes may be screw holes that extend through respective bosses, for example, that extend from the floor 315, the wall 316, etc., of the chassis 312. As an example, the chassis 312 may be a base component configured for receipt of a top component such as, for example, a top component to mount a keyboard, a display, a touchscreen display, etc.

As an example, the cover 382 may be releasable via one or more release mechanisms that respond to a change in a battery or batteries disposed in a battery bay or battery bays. For example, the assembly 310 of FIG. 3 may include a mechanism that includes one or more of the features described with respect to FIG. 2; noting that the assembly 310 may optionally include one or more features described with respect to other examples herein (see, e.g., examples of FIGS. 4, 5, 6, and 9).

Figure 4:
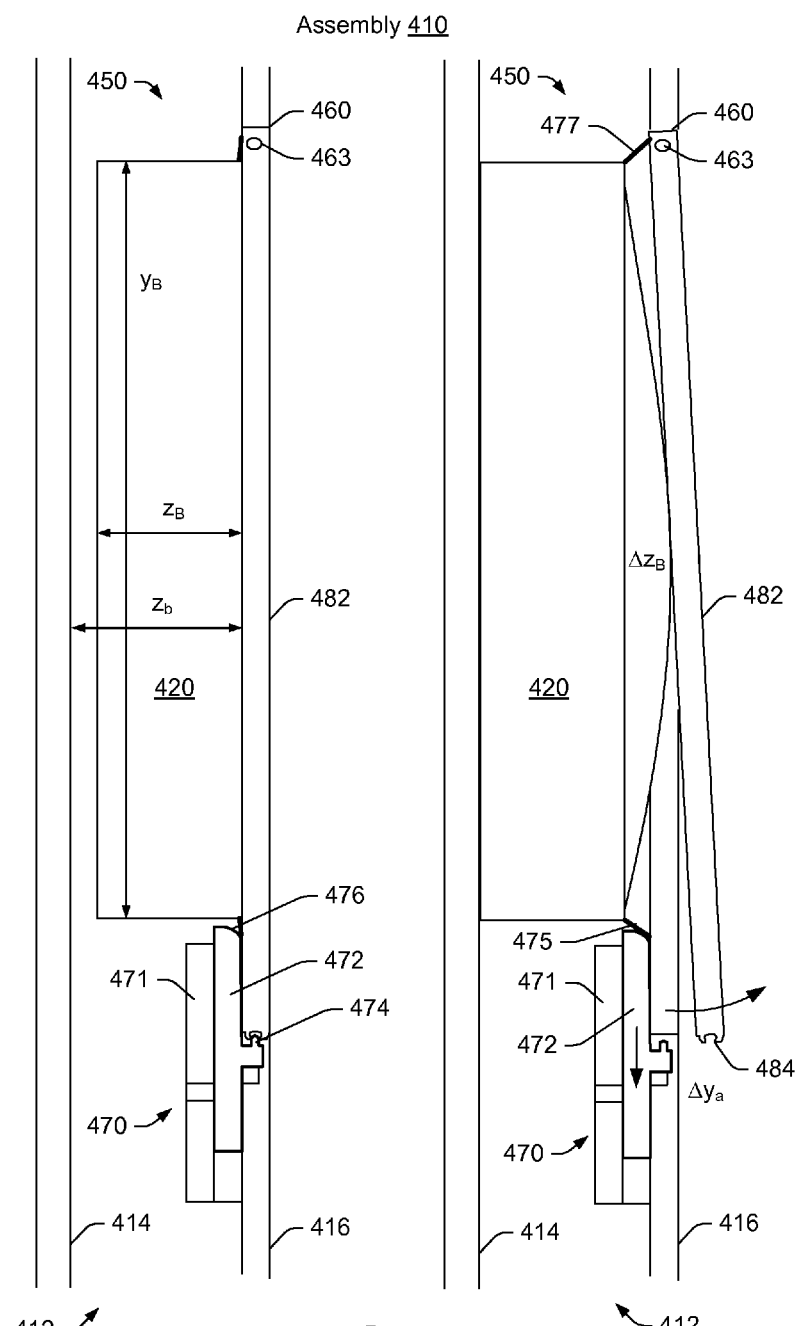
FIG. 4 is a series of diagrams of an example of an assembly that includes a cover and a cover release mechanism.

FIG. 4 shows an example of an assembly 410 in two different states. In the example of FIG. 4, a chassis 412 includes walls 414 and 416, a battery bay 450 for receipt of a battery 420, a cover seat 460, a cover release mechanism 470 and a cover 482 configured to be seated in a seated state with respect to the cover seat 460 and in an unseated state upon release of the cover 482 by the cover release mechanism 470. In the example of FIG. 4, the cover 482 is hinged via a hinge mechanism 463 such that the cover 482 may rotate about a hinge axis (e.g., between a seated state and an unseated state).

As to the cover release mechanism 470, it may be an automatic release mechanism automatically actuatable by an increase in battery volume of the battery 420 disposed in the battery bay 450 to release the cover 482 from its seated state with respect to the cover seat 460. In the example of FIG. 4, the mechanism 470 includes a mount 471 for mounting a translatable latch 472 that includes an extension 474 that extends from the latch 472 to engage a socket 484 of the cover 482 to secure the cover 482 in a seated state with respect to the cover seat 460 and that includes an end surface or nose 476.

Also shown in FIG. 4 is a connector 475 that extends between a fixed surface (e.g., a surface of the wall 416, a surface of the mount 471, etc.) and a moveable surface (e.g., a surface of the battery, etc.) where the movable surface moves upon swelling of the battery 420 (e.g., an increase in volume) in the battery bay 450. As an example, upon swelling of the battery 420, the connector 475 can move, and through contact with the nose 476 of the latch 472, cause the latch 472 to translate in the mount 471 such that the extension 474 translates away from the cover 482 to disengage from the socket 484 of the cover 482. Once the extension 474 of the latch 472 is disengaged from the socket 484 of the cover 482, the cover 482 can swing outwardly about the hinge axis of the hinge mechanism 463 to accommodate swelling of the battery 420 (e.g., increase in volume of the battery 420). As an example, one or more other connectors such as a connector 477 may also be included (e.g., to direct, stabilize, etc., movement of the battery 420 in the battery bay 450).

Various dimensions are shown in the example of FIG. 4, including a battery bay dimension ($z_b$), a battery dimension ($z_B$), a battery differential ($\Delta z_B$) and a latch differential ($\Delta y_a$). As an example, a predetermined battery differential may correspond to a latch differential sufficient for release of the cover 482 (e.g., disengagement of a side of the cover 482). As an example, where a battery bay may accommodate one or more types of batteries that may differ in dimension, one or more shims may be introduced to adjust a release mechanism to provide for release of a cover in response to a certain battery differential (e.g., swelling, volume, etc.).

As shown in FIG. 4, the battery bay 450 has a larger dimension than that of the battery 420 (e.g., $z_b > z_B$). In such an example, movement of the battery 420 may occur in response to swelling to move the battery 420 towards the wall 414, which causes the connector 475 to orient at an angle sufficient to translate the latch 472 and release a side of the cover 482. While the example of FIG. 4 shows a single mechanism, an assembly may include more than one mechanism (e.g., consider two or more of the mechanisms 470).

As an example, a battery bay may include a basket for receipt of a battery such that the basket moves in response to swelling of the battery. For example, referring to FIG. 4, the rectangular box representing the battery 420 may be a basket for carrying a LiPo battery in the battery bay 450. In such an example, one end of the connector 475 may be connected to the basket and another end of the connector 475 may be connected to the wall 416 (e.g., as running along a side of the latch 472).

Figure 5:
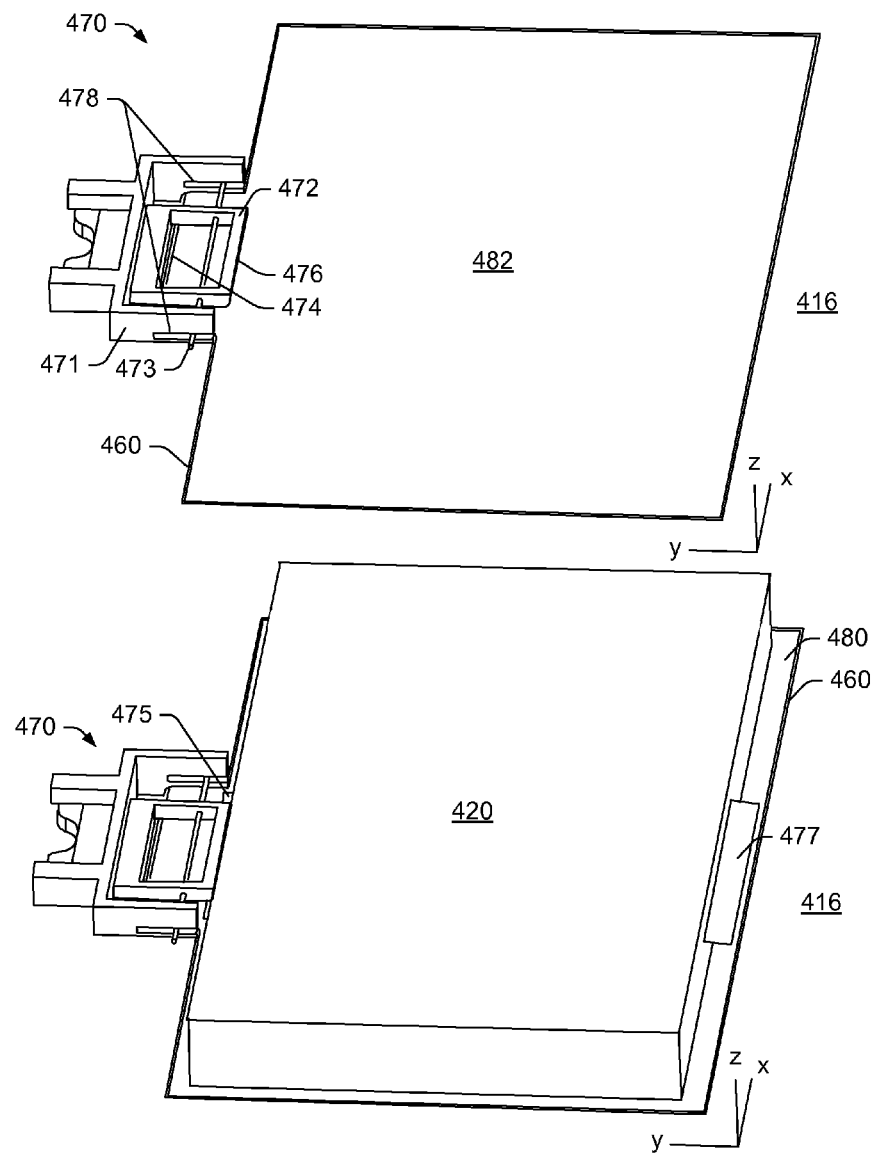
FIG. 5 is a series of diagrams of the example of FIG. 4.

FIG. 5 shows two perspective views of the assembly 410 of FIG. 4. In one perspective view, the mechanism 470 along with the wall 416 including the cover seat 460 and the cover 482 seated in the cover seat 460. As shown, the mechanism 470 can include a guide bar 473 that guides movement of the latch 472 in the mount 471. Thus, as the nose 476 encounters force, it is guided by the guide bar 473 in slots 478 of the mount 471 such that the latch 472 translates in a direction determined by the slots 478. For example, as the connector 475 may rise angularly (e.g. to a predetermined angle, etc.) and apply force to the nose 476 of the latch 472, the guide bar 473 and the slots 478 can help to ensure that the force translates the latch 472 (e.g., rather than substantially tipping the nose 476 of the latch 472).

Figure 6:
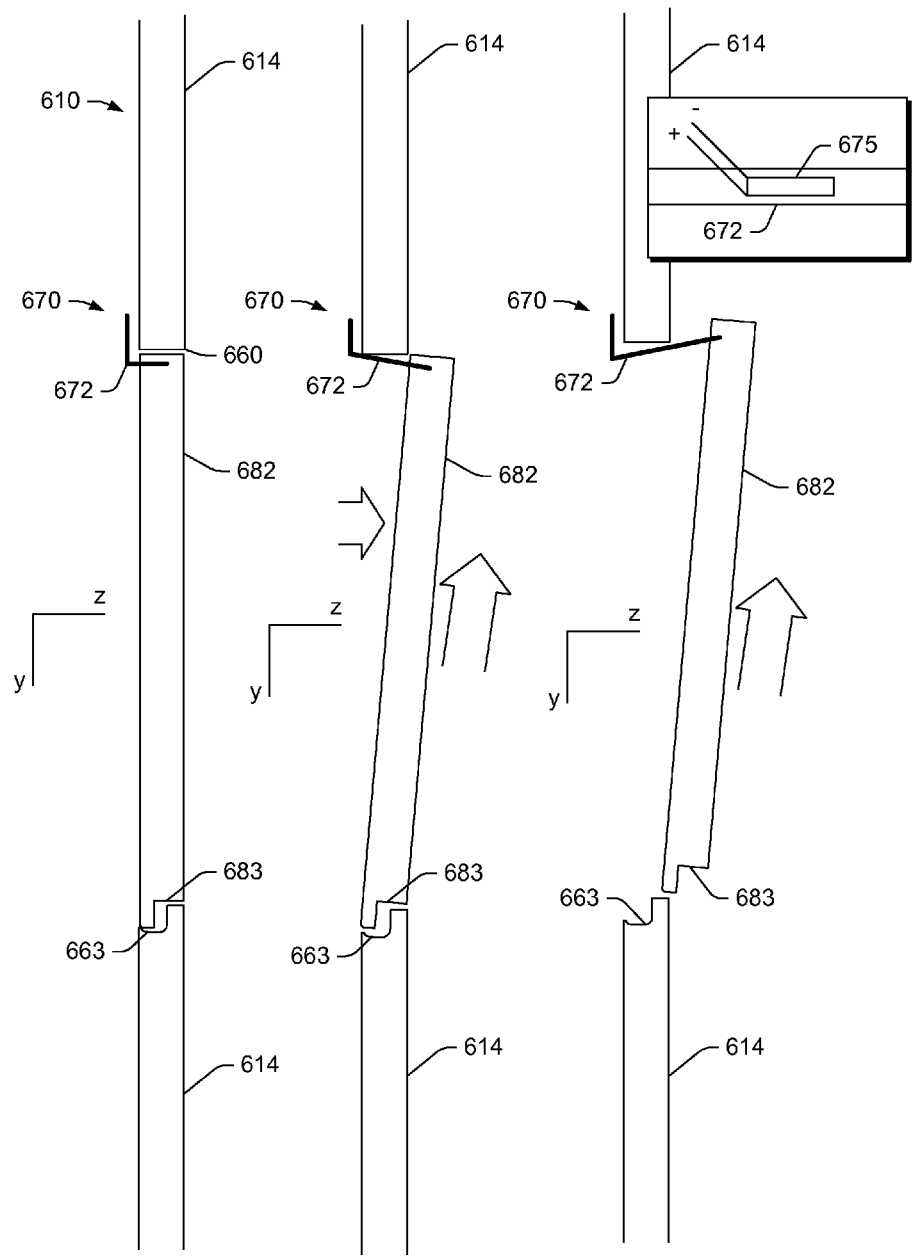
FIG. 6 is a series of diagrams of an example of an assembly that includes a cover and a cover release mechanism.

FIG. 6 shows an example of an assembly 610 with a mechanism 670 for release of a cover 682 where the mechanism 670 includes a deformable member 672, which may be elastically deformable or inelastically deformable. As shown, a wall 614 includes a cover seat 660 that includes a notch 663 configured to cooperate with a notch 683 of the cover 682.

In the example of FIG. 6, a sideways pointing arrow represents a direction of force applied by a swelling battery. In response, the member 672 deforms such that the cover 682 can transition from a seated state to an unseated state with respect to the cover seat 660. For example, the member 672 may be secured at one end to the wall 614 and at another end to the cover 682 where deformation of the member 672 allows movement of the cover 682 sufficient to disengage the notch 683 of the cover 682 from the notch 663 of the cover seat 660 (e.g., as defined by a portion of the wall 614).

As an example, the member 672 may be a spring (e.g., metal, synthetic, wound, spiral, etc). As an example, the member 672 may be defined with respect to a spring constant where, for example, the spring constant is selected based at least in part on one or more characteristics of a lithium battery (e.g., a LiPo battery, etc.). As an example, an assembly may include multiple members such as the member 672, which may be arranged along one or more sides of a cover seat and cover.

As an example, the member 672 may be operatively coupled to a sensor 675 such as, for example, a strain sensor. In such an example, the sensor may provide a signal (e.g., impedance, active signal, etc.) that corresponds to a level of strain, a strain differential, etc. An assembly may include circuitry to receive a sensor signal and to optionally respond to such a signal. For example, upon swelling of a battery, a strain sensor of an assembly may provide an indication (e.g., visual, audible, etc.) that swelling has or is occurring and that a user may wish to have the assembly serviced.

As an example, an assembly may include one or more contact switches. As an example, a contact switch may rely on contact between a cover and a cover seat such that unseating of the cover from the cover seat causes an interruption in the contact switch. Such a switch may be to electrically disconnect a battery or batteries from one or more circuits of an assembly (e.g., to prevent use of a battery, charging of a battery, etc.). As an example, a deformable member may include an electrically connector that disconnects in response to deformation (e.g., deformation beyond a certain limit, etc.). In such a manner, swelling of a battery may deform the deformable member and electrically disconnect the battery from one or more circuits of an assembly (e.g., to prevent use of the battery, charging of the battery, etc.). As an example, a switch may cause (e.g., directly or indirectly) issuance of an alarm (e.g., to indicate swelling has occurred or is occurring). In such an example, the alarm may be audible, visual, communicated via a network connection (e.g., via email, etc.).

Figure 7:
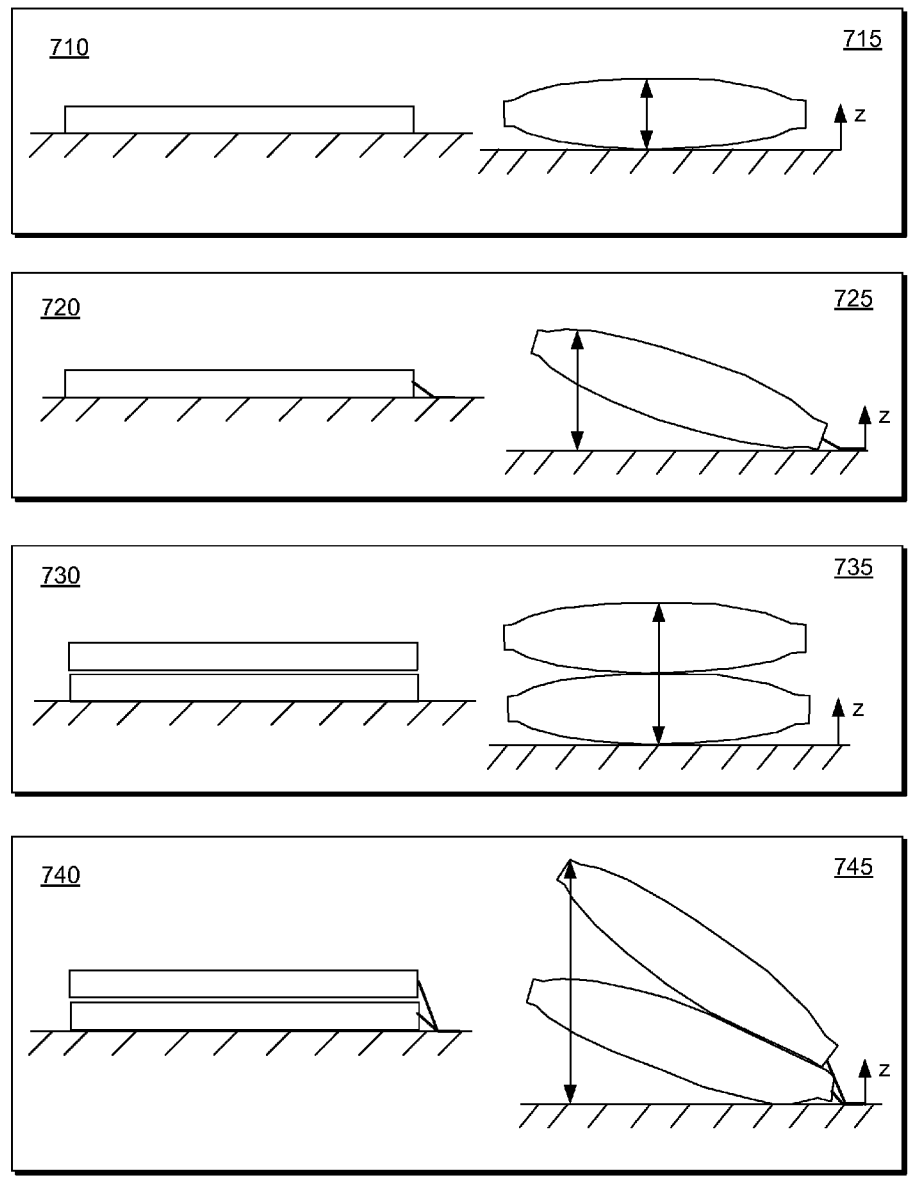
FIG. 7 is a series of diagrams of examples of batteries.

FIG. 7 shows various approximate profiles for examples of one or more LiPo batteries in a normal state and in a swelled state. As shown, a LiPo battery in a normal state 710 may swell to increasing dimension in a swelled state 715. In another example, a LiPo battery in a normal state 720 is anchored such that the battery in a swelled state 725 rises at an angle due to the anchor. In yet another example, two LiPo batteries are stacked and shown in a normal state 730 where swelling of the two LiPo batteries increase in dimension in a swelled state 735. Another example shows two LiPo batteries that are stacked and anchored in a normal state 740 such that the batteries in a swelled state 745 rise at angles due to the anchors.

As an example, a mechanism to release a cover may account for how a battery or batteries are mounted in a battery bay. For example, where a battery is anchored at one side, a release mechanism may respond to movement of another unanchored side of the battery. Further, where batteries are stacked and anchored along a side, a release mechanism may respond to movement of another unanchored side of an upper most or lower most of the batteries.

Figure 8:
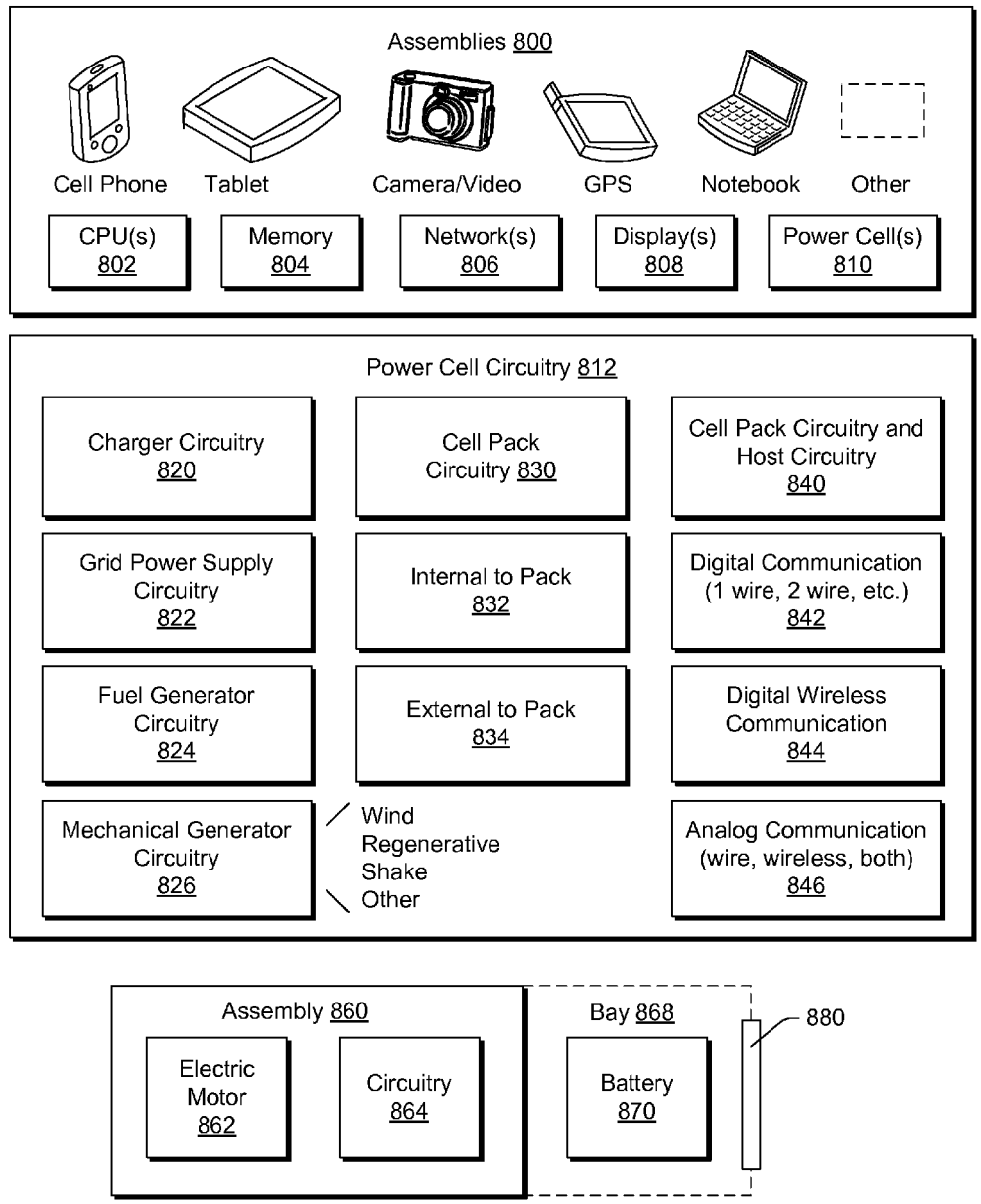
FIG. 8 is a series of diagrams of examples of assemblies and examples of power cell circuitry.

FIG. 8 shows some examples of assemblies 800 that may be powered by a lithium-ion cell or cells, for example, optionally in the form of one or more lithium polymer batteries. As shown in FIG. 8, for example, a cell phone, a tablet, a camera, a GPS device, a notebook computer, or other device may be powered by a lithium-ion cell or cells. As to other devices, a device may be an electric vehicle or a hybrid vehicle. A device may be an automobile, a power tool, a toy, a remote control device (e.g., a bomb sniffers, drones, etc.), etc. A device may include one or more processors 802, memory 804, one or more network interfaces 806, one or more displays 808 and, as a power source, one or more lithium-ion cells 810 (e.g., provided as one or more lithium batteries).

As an example, a power tool may be a drill, a saw, or other type of motorized tool. As an example, a power tool can include a battery bay for receipt of a lithium battery where a release mechanism acts to release a battery bay cover in response to an increase in volume of a lithium battery disposed in the battery bay of the power tool. As an example, a power tool may include a detachable chassis that includes a battery bay. In such an example, the detachable chassis may include a release mechanism that acts to release a battery bay cover in response to an increase in volume of a lithium battery disposed in the battery bay of the detachable chassis. As an example, a user may have two or more detachable chassis where if a battery in one of the detachable chassis as attached to a power tool becomes discharged, the user may swap out that detachable chassis for another with a charged battery. Where swelling occurs during storage, a cover release mechanism may release a cover (e.g., transition the cover from a seated to an unseated state) and thereby avoid or mitigate damage to the detachable chassis.

An assembly (e.g., a device) may include or operably connect to power cell circuitry 812. The power cell circuitry 812 includes circuitry for charging one or more power cells such as one or more lithium-ion cells. The power cell circuitry 812 may be provided as charger circuitry 820, cell pack circuitry 830 or cell pack circuitry and host circuitry 840. As an example, the charger circuitry 820 may include one or more of grid power supply circuitry 822 for connection to a power grid; fuel generator circuitry 824 for connection to a fuel-powered electricity generator (e.g., oil, ethanol, sun, gas, etc.); and mechanical generator circuitry 826 for connection to mechanical equipment such as a wind generator, a regenerative generator (e.g., as in regenerative braking), a shaking generator (e.g., as in a hand motion actuated generator), or other generator (e.g., crank, etc.). As an example, the cell pack circuitry 830 may include one or more of circuitry internal to a cell pack or external to a cell pack. As an example, the cell pack circuitry and host circuitry 840 may include one or more of digital communication circuitry 842 for communicating via 1 wire, 2 wires, etc.; wireless digital communication circuitry 844; and analog communication circuitry 846 (e.g., wired, wireless or both).

FIG. 8 shows an example of an assembly 860 that includes an electric motor 862, circuitry 864, a battery bay 868 for a battery 870 and a release mechanism 880 for releasing a cover that can cover the battery bay 868. As an example, the assembly 860 may be a power tool, a vehicle, a toy, etc.

As an example, an assembly can include a processor; a memory device with memory accessible by the processor; a display accessible by the processor; a chassis that includes a battery bay and a cover seat; a lithium battery disposed in the battery bay; a cover securable in a seated state with respect to the cover seat to cover the battery bay; and an automatic release mechanism automatically actuatable by an increase in battery volume of the lithium battery disposed in the battery bay to release the cover from its seated state.

As an example, an assembly may include a smart battery system (SBS). As an example, a SBS can include a smart battery, an AC-DC converter, a smart battery charger, a bus, a system power supply, a system power controller, and a system host. As an example, a smart battery charger can include charging circuitry that can provide the smart battery with charging current and charging voltage. As an example, a system host can include circuitry operable with a bus that allows for signals to be received from circuitry of a smart battery, signals to be transmitted to the circuitry of the smart battery, signals to be transmitted to a smart battery charger, etc. As an example, a system host may include a SMBus host (e.g., "2 wire") or a so-called "1 wire" host that can request information from circuitry of a smart battery, receive information responsive to the request, and transmit the received information to appropriate circuitry of a host.

Figure 9:
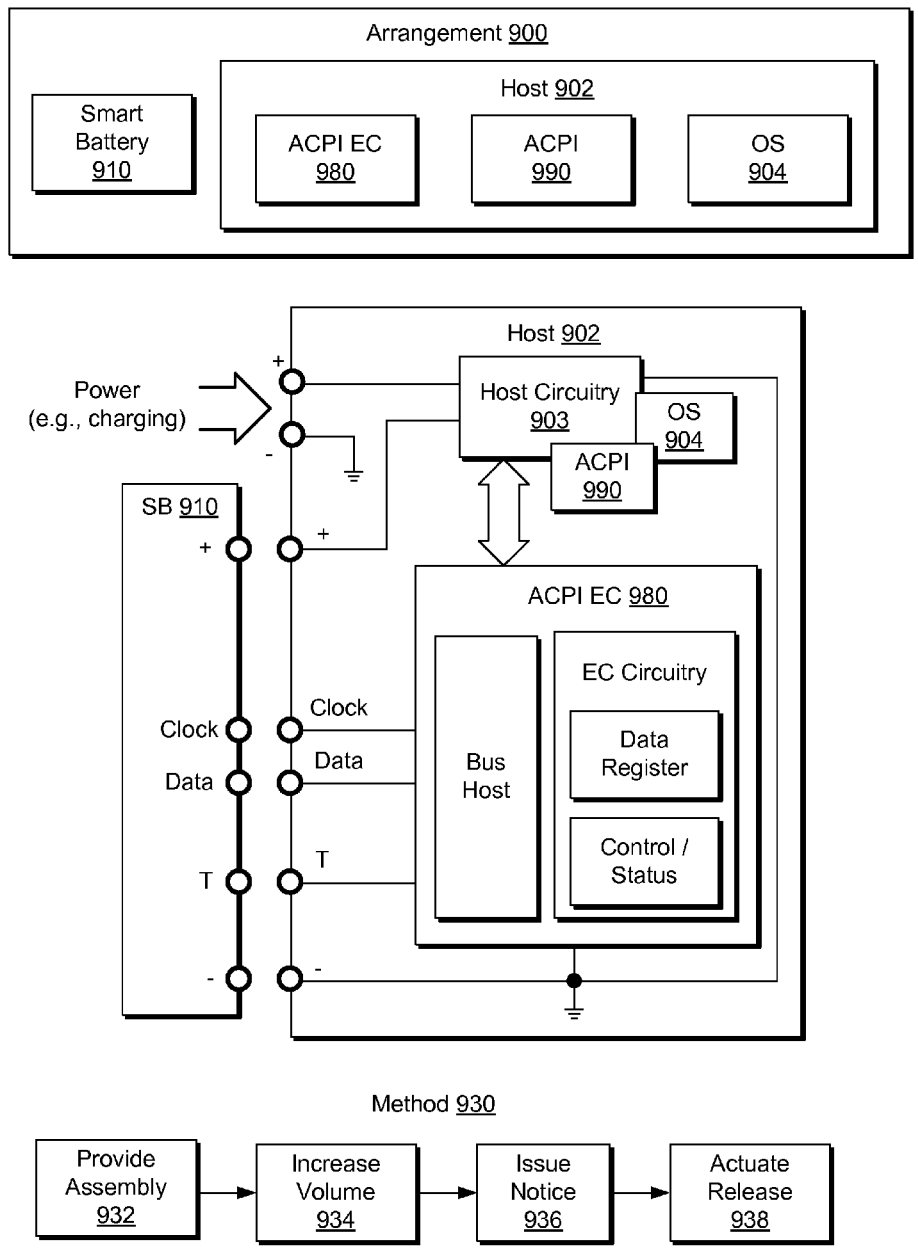
FIG. 9 is a series of diagrams of an example of an arrangement of components of an assembly and an example of a method.

FIG. 9 shows an example of an arrangement 900 that includes a host 902 and a smart battery 910. In the example of FIG. 9, the host 902 includes host circuitry 903, an operating system 904 (e.g., executable using one or more processors and memory), an advanced configuration and power interface embedded controller (ACPI EC) 980 and an ACPI layer 990.

The ACPI layer 990 may be provided as a software-based interface that defines a power management and configuration mechanism for hardware and operating systems. The ACPI layer 990 may provide for power management such as OS-directed power management (OSPM). The ACPI layer 990 may operate according to states (e.g., as a state machine). The ACPI layer 990 may operate according to one or more policies (e.g., set by a policy manager) that provide rules for one or more states and provide for interaction with one or more device drivers, for example, to provide commands, instructions, etc., related to one or more devices (e.g., including a smart battery). Such an approach may provide a state machine where relevant information causes a change in state, for example, according to one or more policies.

As to the embedded controller (EC) 980, it may provide for control of various equipment (e.g., human interaction equipment), one or more background tasks, etc. For example, the EC 980 may be circuitry of a notebook computer that manages traffic across one or more buses for peripheral, built-in or other devices. The EC 980 may operate according to firmware, which may be associated with particular BIOS. As an example, EC firmware may be altered (e.g., upgraded, etc.) via information transmitted via a network connection, loaded via a computer-readable storage medium, etc.

As an example, an EC may be mounted on a motherboard of an information handling system (e.g., a computer, a tablet, a cellular communication device, a ECU of a vehicle, etc.) and include functionality for power management (e.g., for a battery charger, a smart battery, one or more cooling fans, etc.). As an example, communication may occur between a chipset and an EC via a low pin count (LPC) host. As an example, communication may occur between an EC and a device via an I$^2$C bus (e.g., a SMBus).

A so-called SMBus control method interface (CMI) allows an EC to act via an ACPI layer, for example, via ACPI control methods where a driver allows for use of SMBus CMI objects by an operating system, system software (e.g., hypervisor or other), user applications, etc. As an example, a SMBus CMI can allow for device control via EC-based or non-EC-based SMBus host controller hardware.

FIG. 9 also shows a diagram of the arrangement 900 with some additional details such as physical interfaces for connection to a power source for charging the smart battery 910 (e.g., an AC/DC power adapter, a DC/DC power adapter, etc.) and for connection to the smart battery 910 (e.g., as disposed in a battery bay of an assembly). As shown, the ACPI EC 980 can include EC circuitry and a bus host. The EC circuitry may include data registers, control and status circuitry while the bus host provides for communication via an interface of the smart battery 910.

FIG. 9 also shows an example of a method 930 that includes a provision block 932 for providing an assembly, an increase block 934 for increasing volume of a battery, an issue block 936 for issuing an notice as to the increasing volume of the battery and an actuation block 938 for actuating a release mechanism to release a cover that covers a battery bay that includes the battery.

As an example, the arrangement 900 may be configured to implement a method such as the method 930. In such an example, the method may include receiving a signal from a sensor, measuring a state of a sensor, responding to an impedance of a sensor, etc. For example, one or more of the components in the arrangement 900 may provide for managing charging of one or more cells of the smart battery 910 where a sensor provides an indication that swelling of a battery (e.g., increase in volume) has occurred or is occurring.

As an example, a smart battery may be provided with a strain gauge where information indicative of strain may be communicated from the smart battery to a host. As an example, a release mechanism may be provided with a strain gauge where information indicative of strain may be communicated from the release mechanism to a host. As an example, a host may include features of the host 902 of FIG. 9 where information indicative of strain may be used to manage one or more operations associated with a battery or batteries (e.g., issuing a notification, a trigger, etc.).

As an example, a release mechanism may optionally be actuatable via a signal in response to strain or other sensed information indicative of an increase in volume of a battery. As an example, a signal may cause release of a cover that covers a battery bay of an assembly and may also disconnect the battery from one or more circuits of the assembly.

As an example, a method can include providing an assembly that includes a processor, a memory device with memory accessible by the processor, a battery bay, a lithium battery disposed in the battery bay to power at least the processor and the memory device, a cover seat, a cover secured in a seated state with respect to the cover seat to cover the battery bay and the lithium battery, and an automatic release mechanism automatically actuatable by an increase in battery volume of the lithium battery to release the cover from its seated state; increasing battery volume of the lithium battery; and responsive to the increasing, automatically actuating the automatic release mechanism and releasing the cover from its seated state. In such an example, the provided assembly can include a display where the method includes sensing an increase in battery volume and issuing a notification for display to the display based at least in part on the sensing.

As an example, such a method may include recharging the lithium battery. As an example, a method may include generating gas during recharging, during discharging or both to cause increasing battery volume of a battery.

In the various examples described herein, a battery may be a lithium battery (e.g., a lithium polymer battery or other type of lithium battery). In the various examples described herein, a battery may be, for example, in a pouch format or a prismatic format (e.g., or other format that may experience an increase in volume).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 10:
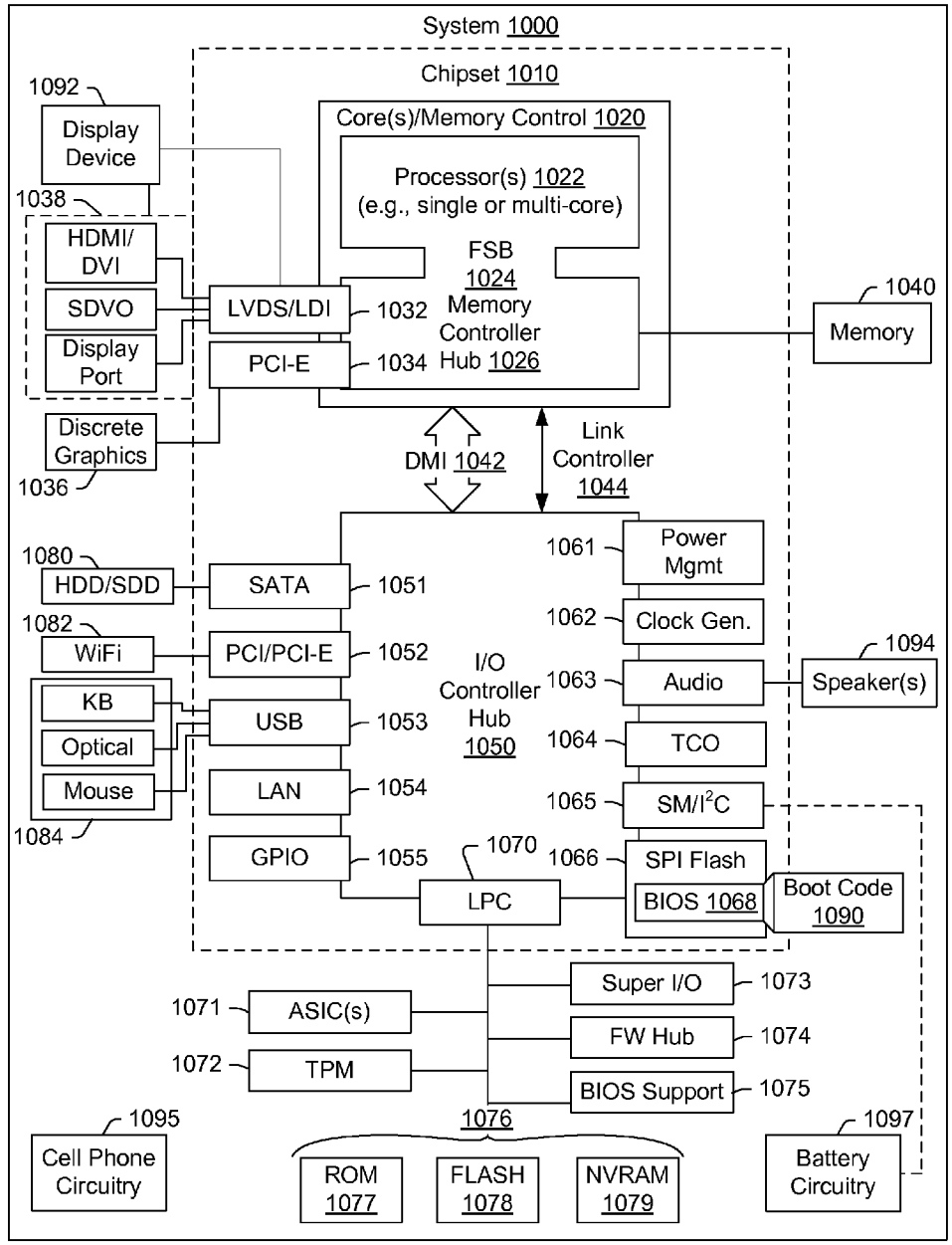
FIG. 10 is a diagram of an example of a system that includes one or more processors.

While various examples of circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000. As described herein, a device such as one of the assemblies 800 of FIG. 8 may include at least some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). A SMBus may be operable via a LPC (see, e.g., the LPC interface 1070), via an I²C interface (see, e.g., the SM/I²C interface 1065), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An assembly comprising:
   a chassis that comprises a processor, a memory device with memory accessible by the processor, a battery bay and a cover seat;
   a lithium battery disposed in the battery bay;
   a cover securable in a seated state with respect to the cover seat to cover the battery bay; and
   an automatic release mechanism automatically actuatable by an increase in battery volume of the lithium battery disposed in the battery bay wherein the automatic release mechanism comprises an elastic bar elastically deformable responsive to an expansion force associated with an increase in battery volume of a lithium battery disposed in the battery bay and wherein the elastic bar comprises a fastener, the chassis comprises a receptacle and deformation of the elastic bar translates the fastener in the receptacle for release of the fastener from the receptacle to release the cover from its seated state.

2. The assembly of claim 1 wherein the lithium battery comprises a lithium polymer battery.

3. The assembly of claim 1 comprising a plurality of lithium polymer batteries.

4. The assembly of claim 1 comprising a manual release mechanism to release the cover from its seated state.

5. The assembly of claim 4 wherein the manual release mechanism comprises a member selected from a group consisting of a bolt, a screw, a lever, a knob, a button, and a latch.

6. The assembly of claim 1 wherein the the elastic bar connects the cover to the chassis.

7. The assembly of claim 6 wherein the elastic bar applies a biasing force to bias the cover in its seated state, the biasing force being less than an expansion force associated with an increase in battery volume of a lithium battery disposed in the battery bay.

8. The assembly of claim 1 comprising a strain gauge positioned to sense strain responsive to an increase in battery volume of a lithium battery disposed in the battery bay.

9. The assembly of claim 1 wherein the chassis comprises a mechanical keyboard.

10. The assembly of claim 1 wherein the chassis comprises a touchscreen display.

11. The assembly of claim 1 wherein the assembly comprises an electric motor.

12. The assembly of claim 1 wherein elastic deformation of the elastic bar translates the fastener in the receptacle via elongation of the elastic bar.

13. The assembly of claim 1 wherein the fastener comprises a T-shape and wherein the receptacle comprises a T-shape.

14. The assembly of claim 1 further comprising another cover securable in a seated state with respect to the another cover seat of the chassis to cover the battery bay wherein the chassis comprises opposing sides and wherein one of the cover seats is disposed in one of the opposing sides and wherein the other one of the cover seats is disposed in the other one of the opposing sides.

15. The assembly of claim 1 wherein the lithium battery comprises a width and a length, wherein the cover comprises a width and a length and wherein the width of the lithium battery exceeds the width of the cover, the length of the lithium battery exceeds the length of the cover or the width of the lithium battery exceeds the width of the cover and the length of the lithium battery exceeds the length of the cover.

16. An assembly comprising:
a processor;
a memory device with memory accessible by the processor;
a display accessible by the processor;
a chassis that comprises a battery bay and a cover seat;
a lithium battery disposed in the battery bay;
a translatable cover latch;
a cover securable by the translatable cover latch in a seated state with respect to the cover seat to cover the battery bay; and
a connector connected at a movable end to the lithium battery and at a fixed end to the chassis wherein the connector contacts and translates the translatable cover latch responsive to movement of the movable end by an increase in battery volume of the lithium battery disposed in the battery bay to release the cover from its seated state.

17. A method comprising;
in an assembly that comprises a processor, a memory device with memory accessible by the processor, a battery bay, a lithium battery disposed in the battery bay to power at least the processor and the memory device, a chassis that comprises a cover seat, a cover latch, a connector connected at a fixed end to the chassis and at a movable end to the lithium battery and a cover wherein the cover latch secures the cover in a seated state with respect to the cover seat to cover the battery bay and the lithium battery, increasing battery volume of the lithium battery;
responsive to the increasing, moving the movable end of the connector;
responsive to the moving, translating the cover latch; and
responsive to the translating, releasing the cover from its seated state.

18. The method of claim 17 comprising recharging the lithium battery.

19. The method of claim 17 wherein the increasing battery volume comprises generating gas.

20. The method of claim 17 wherein the assembly comprises a display and comprising sensing an increase in battery volume and issuing a notification for display to the display based at least in part on the sensing.

* * * * *